US009347364B2

(12) United States Patent
Quix et al.

(10) Patent No.: US 9,347,364 B2
(45) Date of Patent: May 24, 2016

(54) TEMPERATURE CONTROL ARRANGEMENT FOR TRANSMISSION OIL IN A MOTOR VEHICLE AND METHOD FOR CONTROLLING THE TEMPERATURE OF TRANSMISSION OIL IN A MOTOR VEHICLE

(71) Applicant: FORD GLOBAL TECHNOLOGIES, LLC, Dearborn, MI (US)

(72) Inventors: Hans Guenter Quix, Herzogenrath (DE); David Van Bebber, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/461,854

(22) Filed: Aug. 18, 2014

(65) Prior Publication Data
US 2015/0059665 A1    Mar. 5, 2015

(30) Foreign Application Priority Data

Aug. 28, 2013   (DE) .................. 10 2013 217 153

(51) Int. Cl.
*F01P 7/14*        (2006.01)
*F01P 11/08*       (2006.01)
(Continued)

(52) U.S. Cl.
CPC . *F01P 11/08* (2013.01); *F01P 3/12* (2013.01); *F01P 7/165* (2013.01); *F01P 11/04* (2013.01); *F02M 25/0735* (2013.01); *F16H 57/0413* (2013.01); *F01P 3/207* (2013.01);
(Continued)

(58) Field of Classification Search
CPC ......... F01P 7/16; F01P 2050/04; F01P 3/207; F01P 7/165; F01P 2007/146

USPC ......................................................... 123/41.9
See application file for complete search history.

(56) References Cited

U.S. PATENT DOCUMENTS 4,535,729 A    8/1985   Faylor
5,289,803 A *  3/1994   Matsushiro et al. ......... 123/41.1
(Continued)

FOREIGN PATENT DOCUMENTS

DE    10301448 A1    7/2004
JP    2004232514 A   8/2004

OTHER PUBLICATIONS

German Examination Report for Application No. 10 2013 217 153.6, dated May 5, 2014.

*Primary Examiner* — Lindsay Low
*Assistant Examiner* — Charles Brauch
(74) *Attorney, Agent, or Firm* — James Dottavio; Brooks Kushman P.C.

(57) ABSTRACT

A temperature control arrangement for transmission oil in a motor vehicle comprises a coolant circuit which fluidly connects an internal combustion engine and a cooler. The coolant circuit includes a thermostat configured to direct at least a fraction of a coolant leaving the internal combustion engine back to the internal combustion engine, either directly or through the cooler. The temperature control arrangement is configured to direct some of the coolant, flowing back through the cooler or directly, first through the heat exchanger and then to the internal combustion engine. The thermostat is fluidly connected to an interior heater, to the cooler, and to a bypass configured to direct a fraction of the coolant directly back to the internal combustion engine, bypassing the cooler. A suitable method for controlling the temperature of transmission oil in a motor vehicle using a temperature control arrangement of this kind is furthermore indicated.

10 Claims, 4 Drawing Sheets

(51) Int. Cl.
  *F01P 3/12* (2006.01)
  *F01P 11/04* (2006.01)
  *F02M 25/07* (2006.01)
  *F16H 57/04* (2010.01)
  *F01P 7/16* (2006.01)
  *F01P 3/20* (2006.01)

(52) U.S. Cl.
  CPC ............ *F01P 7/16* (2013.01); *F01P 2007/146* (2013.01); *F01P 2050/04* (2013.01); *F01P 2060/045* (2013.01); *Y02T 10/121* (2013.01)

(56) References Cited

U.S. PATENT DOCUMENTS

| | | |
|---|---|---|
| 5,564,458 A | 10/1996 | Roth et al. |
| 5,638,774 A | 6/1997 | Albertson et al. |
| 7,073,576 B2 * | 7/2006 | Peirasso .................. 165/297 |
| 2006/0157002 A1 | 7/2006 | Pfeffinger et al. |
| 2006/0162677 A1 * | 7/2006 | Piddock et al. ............ 123/41.1 |
| 2008/0276886 A1 | 11/2008 | Tsuji et al. |
| 2011/0120396 A1 | 5/2011 | Myers et al. |

* cited by examiner

TEMPERATURE CONTROL ARRANGEMENT FOR TRANSMISSION OIL IN A MOTOR VEHICLE AND METHOD FOR CONTROLLING THE TEMPERATURE OF TRANSMISSION OIL IN A MOTOR VEHICLE

CROSS-REFERENCE TO RELATED APPLICATIONS

This application claims foreign priority benefits under 35 U.S.C. §119(a)-(d) to DE 10 2013 217 153.6 filed Aug. 28, 2013, which is hereby incorporated by reference in its entirety.

TECHNICAL FIELD

The present invention relates to a temperature control arrangement for transmission oil in a motor vehicle, in particular for an automatic transmission, in accordance with the preamble of claim 1 and to a method for controlling the temperature of transmission oil in a motor vehicle, in particular for an automatic transmission.

Transmissions form part of the drivetrain of a vehicle. In the arrangement thereof between the engine and driven wheels, they serve to provide conversion between the engine speed and the respective speed for driving. Apart from multispeed transmissions that can be shifted manually, these can also be actuated in an automated fashion. In the form of automatic transmissions, the design thereof ranges from semiautomatic transmissions to automated and converter-type automatic transmissions and to continuously variable transmissions. Occasionally, automatic transmissions are combined to an increasing extent with internal combustion engines as the engine.

BACKGROUND

As with internal combustion engines, the individual components of automatic transmissions are manufactured in such a way that they intermesh in an ideal way within a particular temperature range. Since the temperature of the transmission increases in operation and with increasing load and revolutions, the transmission oil situated therein must be cooled. For this purpose, the transmission must be fluidly connected to a suitable air/oil cooler, for example. Owing to the increasing dimensions of modern cooling systems in motor vehicles, these are sometimes sufficient to be used for cooling the transmission as well. Suitable devices for this purpose are heat exchangers designed as water/oil heat exchangers, which are used for heat transmission between the coolant circuit of the internal combustion engine and the transmission oil.

In this context, there are efforts being made to use such a construction to heat the transmission oil in the cold starting phase as well. The goal is to reach the operating temperature quickly so as to reduce the resistance within the transmission and hence to reduce energy consumption. Since the coolant in the cooling circuit of the internal combustion engine heats up more quickly than the transmission oil, the heat exchanger provides heat transfer from the coolant to the transmission oil. The heat exchanger thus not only performs the task of cooling transmission oil but, more generally, temperature control thereof. In respect of the arrangement of a heat exchanger of this kind and the operation thereof, a number of embodiments are already known in the prior art.

Thus, according to DE 103 01 448 A1, temperature control of the transmission oil is achieved by providing at least two thermostats. Here, one of the thermostats is associated with a heat exchanger, which serves to exchange heat between the transmission oil and a coolant. Particularly in the cold starting phase of the associated internal combustion engine, the other thermostat serves to allow the coolant to circulate in relation to the internal combustion engine only within a small cooling circuit. Thus, it is only when a predetermined temperature of the coolant is reached that the thermostat is opened and a supply of heated coolant to the heat exchanger is allowed.

JP 2004 232 514 A furthermore discloses an arrangement for controlling the temperature of transmission oil for an automatic transmission of a motor vehicle. The aim is rapid heating of the transmission oil after the internal combustion engine is started so as to reduce fuel consumption when cold starting. For this purpose, a heat exchanger is provided, allowing heat exchange between the cooling water of the internal combustion engine and transmission of the automatic transmission. The arrangement furthermore requires a switching valve with a control system, wherein the switching valve is arranged on a cooling water inlet of the heat exchanger. The switching valve is designed to switch the flow of the cooling water into the heat exchanger between a first and a second cooling water circuit. In this case, the first cooling water circuit corresponds to the cylinder head and the second cooling water circuit corresponds to the engine block of the internal combustion engine. The switching valve is controlled in such a way that the heat exchanger is fluidly connected to the first cooling water circuit to heat the transmission oil and to the second cooling water circuit to cool the transmission oil.

A temperature control arrangement can also be found in US 2011/0120396 A1, said control arrangement having a heat exchanger unit fluidly connected to a coolant circuit. The heat exchanger unit has a heat exchanger part and a valve body coupled to the heat exchanger part. Arranged within the heat exchanger part is a heat exchanger. The heat exchanger is designed to allow heat exchange between transmission oil and a coolant circulating within the coolant circuit. The valve body, in particular, is designed to transfer the coolant leaving an associated internal combustion engine to the respectively appropriate location. For this purpose, an orifice is arranged within the valve body, being used to control the flow of the coolant as a function of the temperature of the coolant and transmission oil. A bypass which bypasses the heat exchanger part is furthermore provided, allowing the coolant to flow out of the internal combustion engine, via a coolant pump, and back into the internal combustion engine without releasing heat to said heat exchanger, particularly in the cold starting phase.

The arrangement of the heat exchanger according to the teachings indicated above allows the transmission oil to be heated after the internal combustion engine has reached its operating temperature. Thus, common to them all is the wait for a predetermined temperature of the coolant to be achieved before said coolant is used to supply the heat exchanger.

Further-reaching teachings envisage heating up the internal combustion engine and transmission in parallel, as described in U.S. Pat. No. 5,638,774 A, for example. This discloses a temperature control arrangement for transmission oil in an automatic motor vehicle. For this purpose, an internal combustion engine and a cooler are provided, which are fluidly connected to one another by a coolant circuit. The coolant circuit contains a thermostat arranged downstream of the cooler. The thermostat is designed to direct a coolant circulating in the coolant circuit at least partially through the cooler and/or, while bypassing the cooler, at least partially through a bypass and back to the internal combustion engine. In order to achieve heat exchange between the coolant and the transmission oil, a corresponding heat exchanger is furthermore provided. Said heat exchanger is arranged within a bypass which bypasses the internal combustion engine. This extends from a segment extending between a heat pump and the internal combustion engine to a coolant circuit segment situated downstream of the internal combustion engine. As a result, the bypass is arranged between the feed section and the return section of the coolant circuit, it being possible for the coolant passing through the cooler and bypassing the cooler to be directed at least partially through the heat exchanger before entering the internal combustion engine. The coolant leaving the heat exchanger is reintroduced into the coolant circuit after the internal combustion engine.

US 2008/0276886 A1 has also disclosed a cooling system for an internal combustion engine, which provides simultaneous heating of transmission oil. In this case, a coolant circuit is used to connect the internal combustion engine fluidly to a cooler. A coolant circulating within the coolant circuit is directed either through the cooler or past the latter with the aid of a thermostat, depending on the temperature of the coolant. Also provided is a heat exchanger, which allows heat exchange between the coolant and the transmission oil in an automatic transmission coupled to the internal combustion engine. For this purpose, the heat exchanger is arranged within a bypass, which extends between the coolant feed toward the cooler and the return from the cooler. Here, the bypass is embodied in such a way that the flow through said bypass, together with the heat exchanger, is in opposite directions, depending on the switching state of the thermostat. As a result, the coolant leaving the internal combustion engine can be directed back to the internal combustion engine, either bypassing the cooler in the case where the thermostat is closed or flowing through the cooler when the thermostat is open and then flowing through the heat exchanger.

By means of the two last-mentioned arrangements of the heat exchanger within the coolant circuit, coupling of the individual phases of temperature control of the coolant and the transmission oil is achieved. For this purpose, the arrangement of a bypass is proposed, extending in each case between the feed and the return of the coolant to the cooler and away from the latter. Owing to the large number of restrictors required for the intended routing of the coolant, US 2008/0276886 A1 demands a relatively complex construction. In addition to this, there are the correspondingly high costs of materials and the increased weight of such an embodiment. In addition, there is the required reversal of direction of the coolant, which requires precise construction of the resistances in the conduits to obtain adequate cooling performance. From the point of view of quick heating of the transmission oil when cold starting, U.S. Pat. No. 5,638,774 A has long loss paths before coolant leaving the internal combustion engine reaches the heat exchanger.

Thus, the heating and cooling performance of the coolant in respect of quick attainment and subsequent holding of the operating temperature of the internal combustion engine, in particular, are affected by the respective construction of such an arrangement. Moreover, such a construction should be embodied in a way which is as simple as possible and yet efficient. Accordingly, the arrangement of a heat exchanger for heat transfer between the coolant and the transmission oil and the operation of a temperature control arrangement of this kind still leave room for improvement.

Given this background, it is the underlying object of the invention to improve a temperature control arrangement for transmission oil in a motor vehicle and a method for controlling the temperature of transmission oil in a motor vehicle in such a way that efficient temperature control of the transmission oil in respect of the rapid heating thereof and in respect of efficient cooling is made possible, despite a simple construction of the arrangement and without additional components.

SUMMARY

It should be noted that the features and measures presented individually in the following description can be combined in any technically meaningful way and give rise to further embodiments of the invention. The description additionally characterizes and specifies the invention, especially in conjunction with the figures.

According to the invention, a temperature control arrangement for transmission oil in a vehicle, particularly for an automatic transmission of a motor vehicle, is presented below. The temperature control arrangement comprises an internal combustion engine and a cooler as well as a heat exchanger. Also provided is a coolant circuit having a thermostat, which fluidly connects the internal combustion engine and the cooler. A suitable coolant circulates within the coolant circuit. The thermostat is designed in such a way and arranged in such a way within the coolant circuit that at least some of the coolant leaving the internal combustion engine can be directed either directly back to the internal combustion engine or, before this, through the cooler and then back to the internal combustion engine. In this arrangement, the heat exchanger is fluidly connected to the automatic transmission and the coolant circuit in such a way that heat transfer between the coolant and the transmission oil is made possible. For this purpose, said heat exchanger is designed as a water/oil heat exchanger.

In respect of the internal combustion engine, this does, of course, have a water jacket, which is arranged at least over a certain area in the wall thereof. The coolant fed to the internal combustion engine is consequently passed through corresponding cavities and/or channels within the wall of the internal combustion engine. During this process, the coolant withdraws heat, in particular, on its way through the wall of the internal combustion engine in order to cool the latter and keep it at operating temperature.

According to the invention, the temperature control arrangement is designed in such a way that at least a fraction of both the fraction of coolant which flows initially through the cooler and then to the internal combustion engine and the fraction of coolant flowing directly back to the internal combustion engine can be directed through the heat exchanger. In other words, said fractions of the coolant can be directed at least partially through the heat exchanger before being fed to the internal combustion engine and, from there, can be introduced into the internal combustion engine. Here, the respective direction of the coolant through the heat exchanger is always the same.

The temperature control arrangement, more precisely the coolant circuit, furthermore has a bypass. The bypass is provided for directly returning the coolant leaving the internal combustion engine. In this context, direct return means return of the coolant over the shortest path. For this purpose, the bypass is preferably fluidly connected directly to the thermostat. In this way, at least a fraction of the coolant leaving the internal combustion engine and then acting upon the thermostat is directed directly back to the internal combustion engine, bypassing the cooler.

Moreover, the arrangement includes an interior heater, which is preferably designed as a gas/coolant heat exchanger. This enables the interior heater to release the thermal energy contained in the coolant to the air in the interior of the vehicle.

This is achieved by air being sucked in from outside the vehicle or from the interior thereof (recirculated air) and routed past or through regions of the interior heater which are in contact with the coolant. This is accomplished by means of a fan, for example. As the air passes through the interior heater, it absorbs some of the thermal energy before finally being directed into the interior of the vehicle.

In order to obtain effective coupling between the interior heater and the internal combustion engine, the thermostat is fluidly connected to the interior heater and to the cooler. In this way, the thermostat forms a controlled distribution point for the coolant which leaves the internal combustion engine and which is generally heated. Here, the connections are preferably chosen in such a way that the interior heater, unlike the cooler, is independent of the heat-regulated switching position of the thermostat. In other words, the thermostat determines the flow rate of the coolant toward the cooler and whether the latter is supplied with coolant at all. Nevertheless, the fraction of coolant fed to the interior heater is independent here of the switching position of the thermostat.

The particular advantage here consists in the full coupling of the heat exchanger to the return of the coolant circuit. Thus, a fraction of the coolant leaving the internal combustion engine flows to the heat exchanger over the shortest direct path, from where, after passing through the latter, it is directed back to the internal combustion engine. At least a fraction of the coolant flowing through the cooler is thus also directed to the heat exchanger, through which it flows before it is directed on to the internal combustion engine.

In this way, the coolant can initially circulate through the internal combustion engine and the heat exchanger while bypassing the cooler in the cold starting phase, thereby ensuring rapid heating of the coolant and of the transmission oil. Said circulation is preferably achieved with the thermostat closed. When a specified temperature is exceeded, the thermostat opens, with the result that both the heat exchanger and the internal combustion engine are supplied with the coolant passing through the cooler. A temperature reduction is thereby brought about in the coolant and the transmission oil, as a result of which the internal combustion engine and the automatic transmission are cooled in a corresponding manner. According to the invention, no additional control and/or arrangement of components is required to achieve the necessary control of the coolant.

Thanks to this construction, any possible inertia in the temperature control of the transmission oil and in reaching the operating temperature is reduced to a minimum. Through the consistent elimination of additional components and the use of components which are required and therefore present in any case, the arrangement is not unnecessarily complicated and made heavier and more expensive. Through the deliberate coupling of the heat exchanger to the lower hose conduit, more specifically the return, the control of the direction of the coolant by means of the thermostat, which is present in any case, is sufficient to allow effective heating and cooling of the internal combustion engine and the transmission. By means of the temperature difference, which is thus sufficient, an effective cooling performance with high operating temperatures and rapid heating from a cold start are consequently achieved.

The arrangement of the bypass provides a coolant circuit which is of as small as possible construction and which, thanks to a short length, ensures rapid circulation of the coolant from the internal combustion engine and back again into said engine. As a result, rapid heating of the internal combustion engine from a cold start is made possible. The bypass preferably opens into a return line, which is fluidly connected to an inlet side of the internal combustion engine. In this context, provision is made for the possibility of arranging the heat exchanger in parallel with said return line and for it to be fluidly connected to it by appropriate connections. As a particularly preferred option here, a heat exchanger connection situated upstream of the return line is arranged downstream of the opening of the bypass into the return line. In this way, the bypass is fluidly connected to the heat exchanger via the return line, in particular via one segment of the return line. Thus, the coolant passing through the bypass can flow simultaneously through the return line and at least in part through the heat exchanger. As a result, rapid heating of the internal combustion engine and of the transmission oil and hence of the transmission, in particular the automatic transmission, is thus achieved approximately simultaneously.

In order to obtain control in respect of the respective flow rate of the coolant first of all to the interior heater and directly back to the internal combustion engine, it is possible in an advantageous embodiment for the temperature control arrangement according to the invention to have a check valve. In the sense according to the invention, a check valve is to be taken to mean a valve which is first of all direction-dependent. In other words, it is designed to allow a fluid flowing through the check valve to pass only in one direction. An unwanted reversal of direction in respect of the direction of flow of the coolant is thereby prevented in an effective manner. Moreover, said check valve has a spring-loaded control element, for example. The control element serves for adjustment of the flow rate passing through the check valve. In this way, the check valve is capable not only of determining the direction but also, in particular, of making the coolant flow rate dependent on the flow velocity thereof.

Said check valve is preferably arranged in or on the thermostat. As a particularly preferred option, the check valve is arranged between the thermostat and the bypass or within the bypass itself. It is advantageous here if the check valve is aligned in such a way that the fraction of coolant leaving the internal combustion engine and flowing via the thermostat toward the bypass can flow into the bypass. In other words, the opposite direction here is blocked by the arrangement of the check valve, and therefore no coolant can get back into the internal combustion engine from the bypass via the thermostat.

Thus, the check valve is capable of adjusting and/or controlling the flow of the coolant leaving the internal combustion engine into the bypass and the interior heater in accordance with the flow velocity thereof. Owing to the arrangement of the check valve, the amount of coolant directed through the bypass is increased as the flow velocity of the coolant increases.

In particular, the flow velocity of the coolant can depend on the speed of the internal combustion engine. This is the case particularly when a pump that delivers the coolant is coupled for torque transmission to the internal combustion engine. Owing to the increase in the delivery rate of the pump with increasing engine speed, the flow velocity of the coolant then increases accordingly. The check valve can be set in such a way that it opens only above a predetermined flow velocity. In combination or as an alternative, the degree of opening of the check valve can be coupled to the flow velocity. In other words, this makes it possible for more coolant to pass through the check valve with increasing flow velocity.

Typically, there is more waste heat available at higher speeds of the internal combustion engine, and this heat can then be used in an advantageous way to heat the transmission oil via the coolant. Thus, the check valve can remain closed at low engine speeds owing to low flow velocities of the coolant.

As a result, the waste heat, of which there is then in any case typically only a small amount, can be used primarily to quickly heat the internal combustion engine.

With a view to reducing nitrogen oxides in the exhaust gas of the internal combustion engine, the temperature control arrangement can advantageously include an EGR cooler. Exhaust gas recirculation (EGR) uses the supply of an inert gas to the combustion air to obtain emissions that are environmentally less damaging. The inert gas used is a portion of the exhaust gas, which is fed back into the combustion process. Since the exhaust gas generally has a high temperature, the recirculation thereof leads to a reduced air mass with correspondingly lower oxygen in the air. In this context, EGR coolers are used to cool the hot exhaust gas before it is recirculated into the combustion process. In this way, it is possible, in particular, to increase the proportion of oxygen in the air, leading to an increase in the exhaust gas quality by virtue of improved combustion.

Said EGR can preferably be arranged downstream of the interior heater. In this position, therefore, it is situated between the interior heater and the internal combustion engine. In this way, the coolant fed to the interior heater is initially passed through the EGR cooler before entering the internal combustion engine. Since some of the thermal energy is removed from the coolant by means of the interior heater, the resulting temperature difference upstream and downstream of the interior heater can be used to cool that fraction of the exhaust gas which is to be recirculated by means of the EGR cooler.

The above-indicated temperature control arrangement for the transmission oil in a motor vehicle, in particular for an automatic transmission, allows effective temperature control of the transmission oil, to a large extent without the arrangement of additional components and controls. Despite the resulting simplicity in the construction of the arrangement, efficient temperature control of the transmission oil in respect of the rapid heating and efficient cooling thereof is made possible. In particular, the arrangement of the heat exchanger used for this purpose on the return of the coolant circuit allows the use of the already existing control provided by the thermostat. Thus, the internal combustion engine and the heat exchanger are supplied in approximately the same way with cooled or uncooled coolant. This applies right from the point of cold starting, ensuring that rapid and thus advantageous heating of the internal combustion engine and the transmission to the respective operating temperatures thereof is achieved within the shortest possible time.

The invention is furthermore directed to a method for controlling the temperature of transmission oil in a motor vehicle, wherein temperature control is performed by means of a suitable temperature control arrangement. In particular, this temperature control arrangement can be the above-indicated temperature control arrangement.

For this purpose, the temperature control arrangement comprises an internal combustion engine and a cooler. The internal combustion engine and the cooler are fluidly connected to one another by a coolant circuit. The coolant circuit furthermore has a thermostat. Said thermostat is designed to direct at least a fraction of a coolant leaving the internal combustion engine either directly back into the internal combustion engine or, before this, through the cooler and, from there, back to the internal combustion engine. Here, the required heat transfer between the coolant and the transmission oil is accomplished by means of a heat exchanger.

According to the invention, some of the coolant flowing back first through the cooler and/or directly to the internal combustion engine is first of all directed through the heat exchanger, before being directed back to the internal combustion engine. Here, the coolant is in all cases routed in the same direction, so that both the coolant flowing directly to the internal combustion engine and the coolant which first of all flows through the cooler are directed through the heat exchanger in the same direction in each case. The thermostat is fluidly connected to a bypass, as a result of which a fraction of the coolant is directed directly back to the internal combustion engine through the bypass while bypassing the cooler. Fractions of the coolant leaving the internal combustion engine can furthermore be directed both to an interior heater and, when required, to the cooler by means of the thermostat.

The resulting advantages have already been described in detail in connection with the above-explained temperature control arrangement according to the invention, therefore attention is drawn at this point to the previous statements. Moreover, this also applies to the further advantageous embodiments of the method according to the invention, which are explained below.

As a particularly preferred option, the thermostat has a check valve for achieving control of the flow rates. Said check valve is then designed to adjust the flow of the coolant leaving the internal combustion engine into the bypass and the interior heater in accordance with the flow velocity thereof. In this way, the amount of coolant directed through the bypass can be increased as the flow velocity of the coolant increases and vice versa.

Of course, with a view to exhaust standards to be complied with and to the general environmental aspect, an EGR cooler can be provided. Preferably, the arrangement of said cooler is such that the coolant flowing through it is coolant which has previously left the interior heater and is on the way back to the internal combustion engine.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is emphasized that the temperature control arrangements shown in FIGS. 1 to 3 described below each show possible constructions that are known in the prior art and have only low effectiveness or a generally complex construction. In contrast with this, FIG. 4 shows the embodiment according to the invention of a temperature control arrangement of the kind claimed within the scope of the invention.

Figure 1:
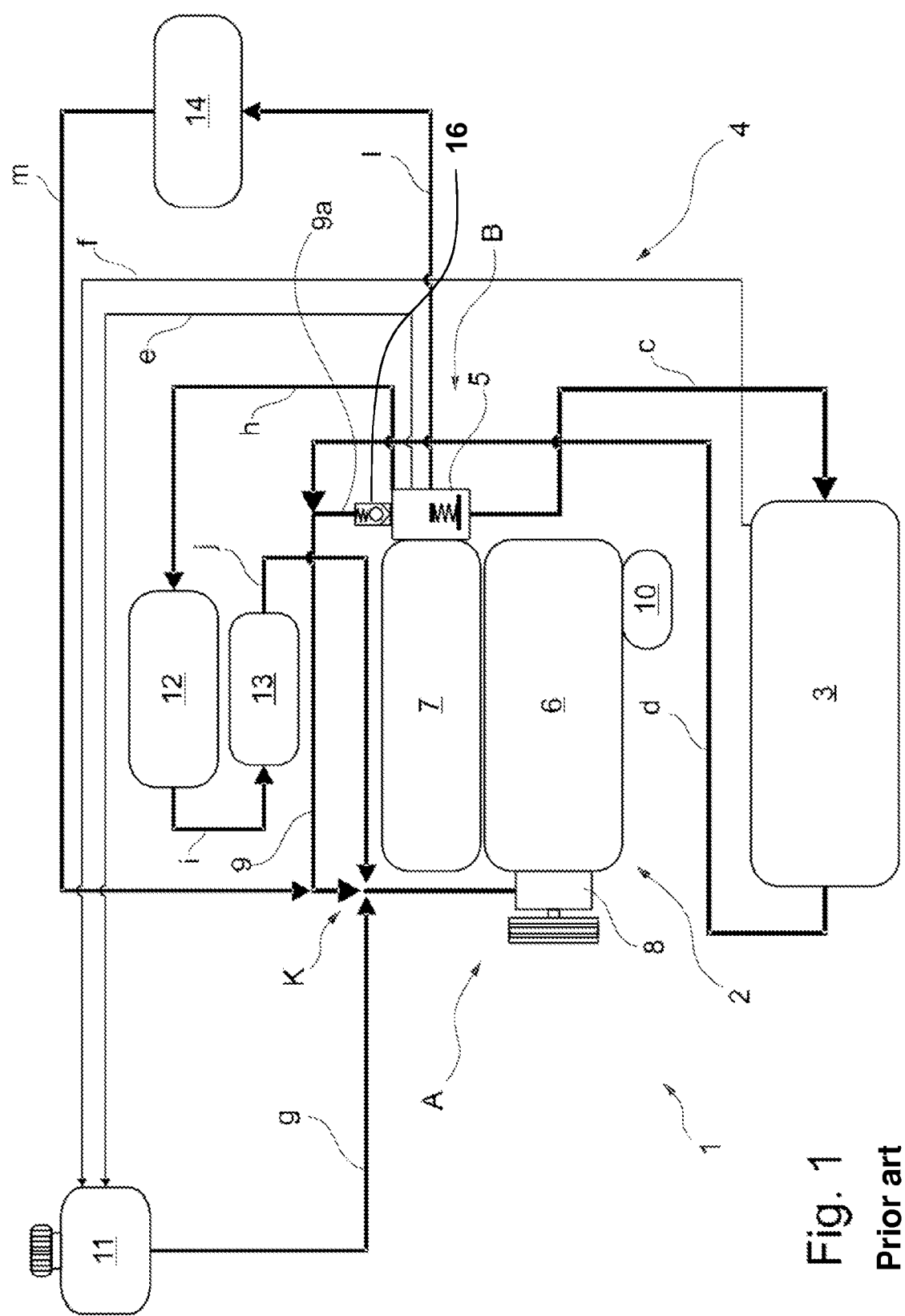
FIG. 1 shows a schematic construction of an illustrative prior art temperature control arrangement for the purpose of clarifying the invention.

A schematic representation of a possible construction of a temperature control arrangement 1 can be found in FIG. 1. The temperature control arrangement 1 is used to control the temperature of transmission oil in a motor vehicle (not shown specifically). As such, the temperature control arrangement 1 comprises an internal combustion engine 2 and a cooler 3. Also provided is a coolant circuit 4, which is made up of different conduits. By means of said coolant circuit 4, the internal combustion engine 2 and the cooler 3 are fluidly connected to one another.

Circulating within the coolant circuit 4 is a coolant (not shown specifically).

The coolant circuit contains a thermostat 5, which in the present case is arranged on the internal combustion engine 2. The internal combustion engine 2 has a water jacket (not shown specifically), which extends in a manner not shown specifically through individual regions of a wall of the internal combustion engine 2. For this purpose, the internal combustion engine 2 has an inlet side A and an outlet side B, wherein the direction of flow of the coolant through the internal combustion engine 2 runs from the inlet side A to the outlet side B. The internal combustion engine 2 itself is made up in a conventional way of an engine block 6 and a cylinder head 7. The engine block 6 and the cylinder head 7 are fluidly connected to one another in an appropriate manner in respect of the water jacket of the internal combustion engine 2.

As is evident, the thermostat 5 is arranged on the outlet side B of the internal combustion engine 2. A pump 8 is arranged opposite said thermostat, on the inlet side A of the internal combustion engine 2. The pump 8 is designed as a coolant pump, and it therefore serves to pump the coolant through the internal combustion engine 2 from the inlet side A to the outlet side B. For this purpose, the pump 8 is driven mechanically by the internal combustion engine 2 in a manner not shown specifically, e.g. by way of a belt drive (not shown).

A feed line c extends toward the cooler 3 from the thermostat 5. Here, the direction of flow of the coolant is from the internal combustion engine 2 toward the cooler 3. A return line 9 is furthermore arranged between the thermostat 5 and the inlet side A of the internal combustion engine 2, said return line being fluidly connected to the thermostat 5 via a bypass 9a. Together with the bypass 9a, the return line 9 represents the shortest connection for the coolant to circulate through the internal combustion engine 2 in the form of a small cooling circuit. Since the bypass 9a is fluidly connected to the thermostat 5, at least a fraction of the coolant can be directed directly to the inlet side A of the internal combustion engine 2, bypassing the cooler 3. As a result, the return line 9 and the bypass 9a represent a virtually direct fluidic connection from the outlet side B in the direction of the inlet side A of the internal combustion engine 2. In this case, the return line 9 is connected on the inlet side A of the internal combustion engine to the pump 8 arranged thereon.

In order to ensure that the coolant returns from the cooler 3 toward the internal combustion engine 2, a cooler return d is furthermore provided. This extends from the cooler 3 toward the return line 9, wherein the direction of flow of the coolant is from the cooler 3 toward the return line 9. The thermostat 5 is actuated in a temperature-dependent manner, varying the flow of coolant into the feed line c in accordance with the temperature of the coolant. Particularly when cold starting the internal combustion engine 2, in which case the coolant is at ambient temperature for example, the thermostat 5 is closed in relation to the feed line c. As a result, the coolant is directed primarily through the bypass 9a back to the inlet side A of the internal combustion engine 2. By virtue of the pumping capacity of the pump 8, the circulating coolant is then passed back into the internal combustion engine 2. This small circuit allows rapid heating of the coolant and, at the same time, prompt achievement of the operating temperature of the internal combustion engine.

As soon as a particular temperature or a particular temperature range of the coolant has been achieved, the thermostat 5 opens fully in the direction of the feed line c. Consequently the now heated cooling water passes primarily through the cooler 3. By virtue of the cooling capacity thereof, heat is removed from the coolant, and it is therefore directed back into the return line 9 with a corresponding temperature difference ($\Delta T$) via the cooler return d. From the return line, the cooled coolant flows back to the internal combustion engine 2 primarily via the inlet side A, thereby cooling the engine or keeping it within a desired operating temperature range.

Further components that should be mentioned are an oil cooler 10, a compensating tank 11, an interior heater 12 and an EGR cooler 13. The oil cooler 10 is arranged on the engine block 6 of the internal combustion engine 2, where it serves to cool the engine oil (not shown specifically). The compensating tank 11 is arranged within the coolant circuit 4. The compensating tank 11 is provided for storing coolant and compensating for any fluctuations in the coolant level. It also serves as a necessary reserve volume to create space for the coolant expanding in the heated state. For this purpose, the compensating tank 11 is connected by a first compensating line e and a second compensating line f to the thermostat 5 and the cooler 3. Here, the first compensating line e extends between the thermostat 5 and the compensating tank 11, while the second compensating line f runs between the cooler 3 and the compensating tank 11. Moreover, a third compensating line g is provided, running from the compensating tank 11 toward the bypass 9a in the vicinity of the inlet side A.

The interior heater 12 and the EGR cooler 13 are arranged in series within the coolant circuit 4. In this arrangement, a heating line h first of all extends from the thermostat 5 toward the interior heater 12. The EGR cooler 13 is arranged downstream of the interior heater 12, and a connecting line i extends from the interior heater 12 toward the EGR cooler 13. In order to ensure return of the coolant, the EGR cooler 13 is fluidly connected via an outflow line j to the return line 9. Here, the outflow line j opens into the return line 9 in the vicinity of the inlet side A. Referring to the illustration, it is clear that the outflow line j of the EGR cooler and the third compensating line g from the compensating tank 11 are fluidly connected to the return line 9 at a common interface K.

Figure 2:
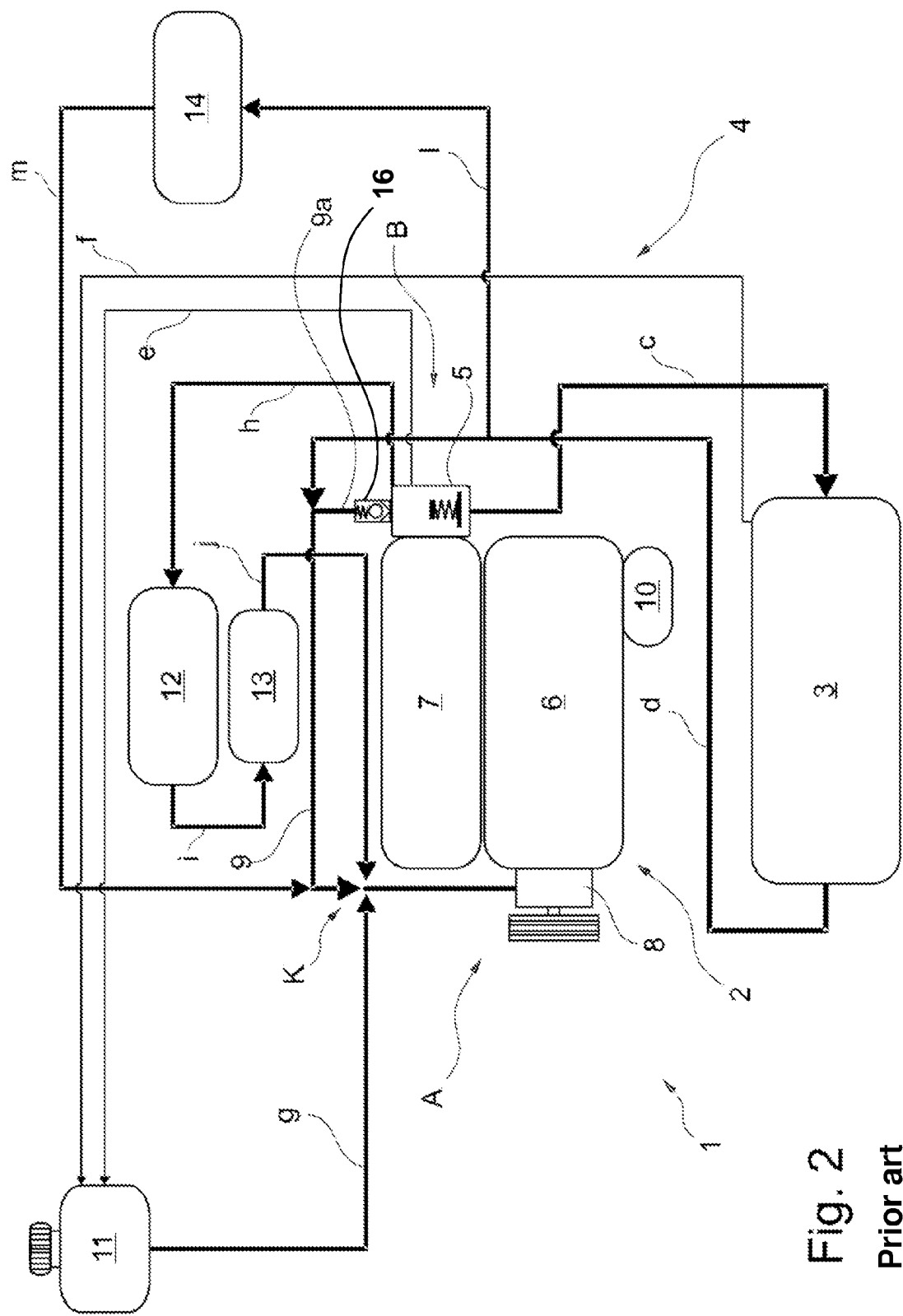
FIG. 2 shows an alternative construction to that in FIG. 1 of a prior art temperature control arrangement for the purpose of clarifying the invention.
Figure 3:
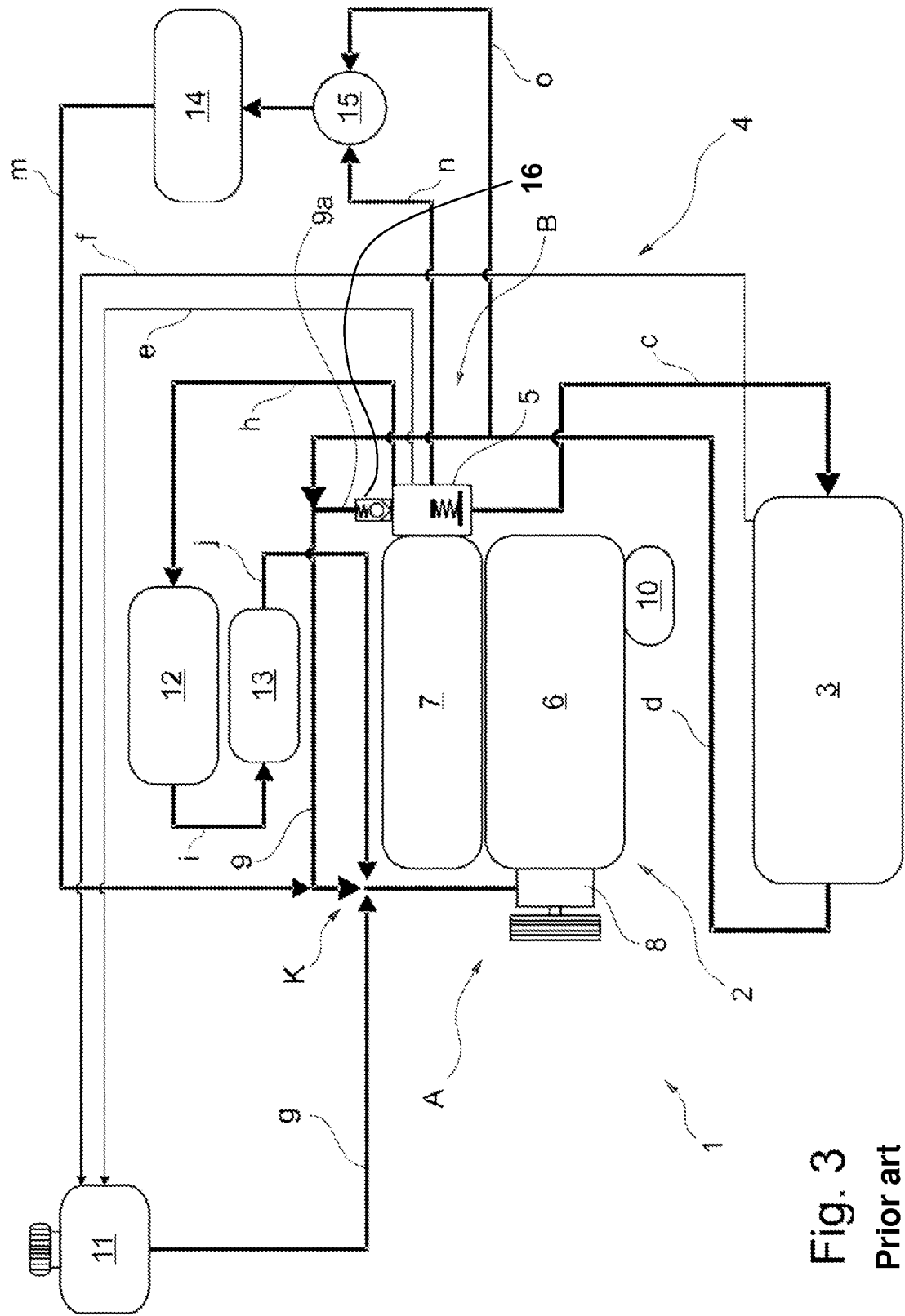
FIG. 3 shows an alternative construction to that in FIGS. 1 and 2 of another prior art temperature control arrangement for the purpose of clarifying the invention.
Figure 4:
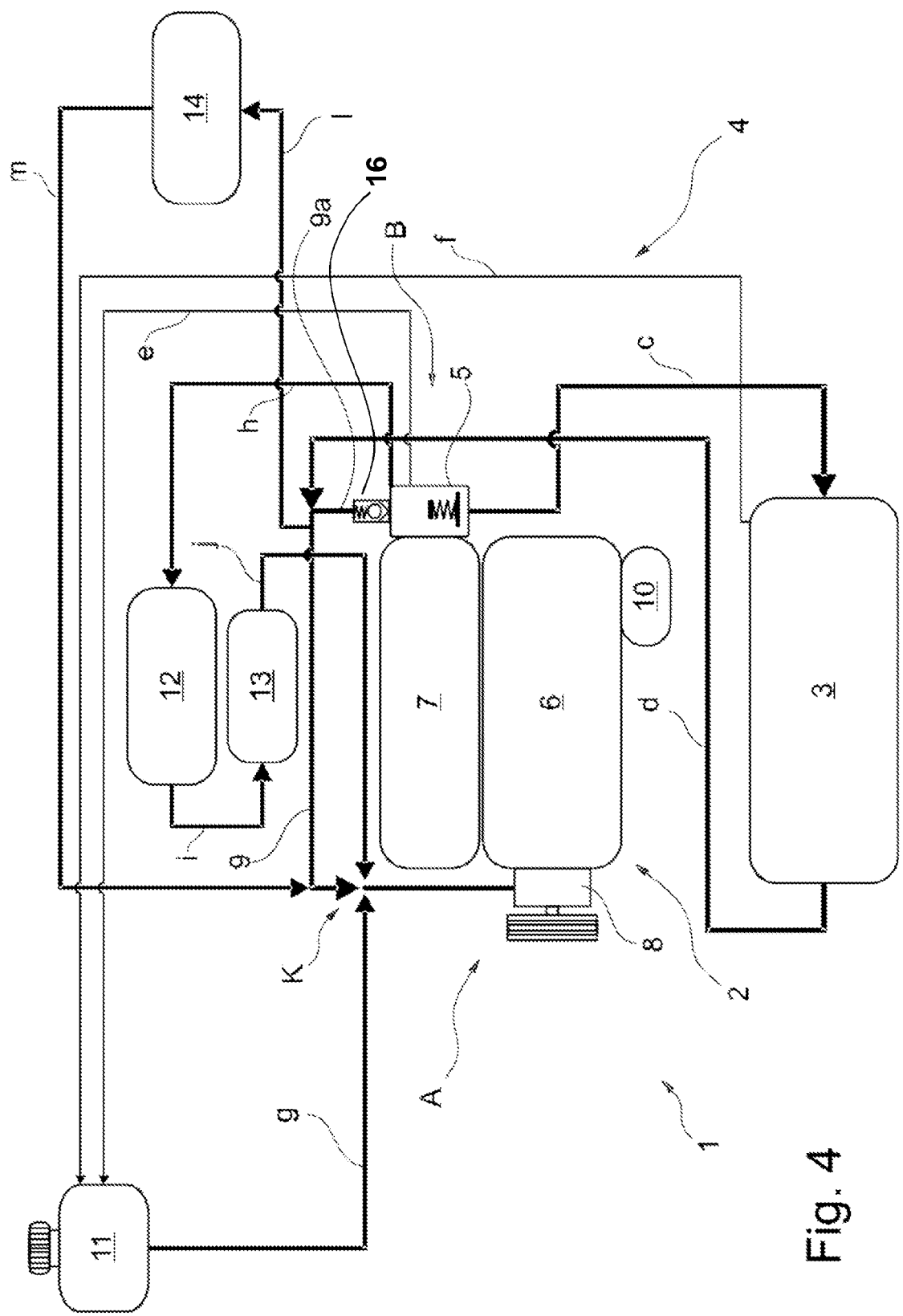
FIG. 4 shows a construction according to the present invention of a temperature control arrangement for transmission oil.

The construction of the temperature control arrangement 1 is described hitherto is identical in all three FIGS. 1 to 3. The only difference is the incorporation of a heat exchanger 14 into the coolant circuit 4, which is provided for heat transfer between the coolant and a transmission oil in a transmission (not shown specifically), in particular in an automatic transmission. As can be seen, said heat exchanger 14 has an inlet line I and an outlet line m, by means of which the heat exchanger 14 is fluidly incorporated into the coolant circuit 4 of the temperature control arrangement 1.

In the present case, the inlet line I extends from the thermostat 5 toward the heat exchanger 14. The outlet line m furthermore extends from the heat exchanger 14 toward the return line 9, where it is fluidly connected to the bypass 9a in the region of the interface K. The direction of flow of the coolant through the heat exchanger 14 thus runs from the thermostat 5, via the inlet line I and the outlet line m toward the return line 9. The heat exchanger 14 is thus arranged between the feed and the return of the coolant circuit 4.

By means of this arrangement of the heat exchanger 14, rapid heating of the transmission oil is achieved since the temperature of the coolant rises rapidly during the operation of the internal combustion engine 2. Owing to the arrangement of the inlet line I on the thermostat 5, there is a direct flow of the coolant heated in this way through the heat exchanger 14. The heat present in this case can be partially released to the transmission oil. As soon as the operating temperature of the internal combustion engine 2 has been reached, the thermostat 5 opens. However, only the relatively hot coolant on the outlet side B of the internal combustion engine 2 is available for cooling the transmission oil since the feed line I does not have a connection to the cooler return d carrying the cooled coolant. As a result, only slight cooling of the transmission oil is possible and an additional cooler is necessary.

FIG. 2 shows the construction of the temperature control arrangement 1 from FIG. 1, wherein the attachment of the heat exchanger 14 has been modified. As can be seen, the inlet line I of the heat exchanger 14 is now fluidly connected not to the thermostat 5 but directly to the cooler return d from the cooler 3. As a result, good cooling of the transmission oil is made possible since the heat exchanger 14 can be supplied directly with cooled coolant. However, rapid heating of the transmission oil when cold starting is not possible since the coolant heated by the internal combustion engine 2 cannot be passed through the heat exchanger 14. Even when the operating temperature of the internal combustion engine 2 is reached and the thermostat 5 is opened, the heat exchanger continues to be supplied with cooled coolant.

FIG. 3 attempts to prevent the disadvantages known from FIGS. 1 and 2 by using an additional three-way valve 15. For this purpose, the inlet line I of FIGS. 1 and 2 is divided into a hot line n and a cold line o. In this arrangement, the hot line n extends between the thermostat 5 and the three-way valve 15, while the cold line o is attached to the cooler return d of the cooler 3 and runs toward the three-way valve 15. Finally, the three-way valve 15 is connected to the heat exchanger 14 by a header line p. Both the hot line n and the cold line o as well as the header line p each form fluidic connections.

This enables the three-way valve 15 to create a connection between the hot line n and the header line p when cold starting, thus allowing the heat exchanger 14 to be supplied with heated cooling water right at the beginning. When a particular temperature of the coolant and/or the transmission oil is reached, in contrast, the three-way valve 15 can establish a connection between the cold line o and the header line p, wherein the hot line n is closed. This then enables cooled coolant to flow out of the cooler 3, via the return line d thereof, the cold line o and the header line p through the heat exchanger 14. As a result, the transmission oil can be cooled by releasing heat to the cooled coolant via the heat exchanger 14.

The disadvantage here is a relatively complex construction of the temperature control arrangement 1, which furthermore requires additional control by means of the three-way valve 15.

The solution according to the invention can be seen in FIG. 4. Here, the proposal is now that the inlet line I of the heat exchanger 14 should likewise be connected to the return line 9 of the coolant circuit 4 downstream of the inlet of the bypass 9a. For this purpose, the inlet line I is fluidly attached to the return line 9 in the region of the outlet side B of the internal combustion engine 2. This ensures that extremely efficient cooling and heating, in other words temperature control of the transmission oil, is achieved without additional components. Since the heat exchanger 14 is now coupled to the switchover of the coolant flow by means of the existing thermostat 5, the flow of hot coolant through said thermostat is maintained for as long as the internal combustion engine 2 is running in a cold starting condition. Once the operating temperature is reached and the thermostat 5 switches over as a result, coolant cooled by means of the cooler 3 flows through both the internal combustion engine 2 and the heat exchanger 14.

As already apparent previously in FIGS. 1 to 3, the thermostat 5 has a check valve 16, which is arranged between the thermostat 5 and the bypass 9a. This serves to control the direction of the coolant, it only being possible for the coolant to flow away from the thermostat 5 into the bypass 9a and not in the opposite direction. Moreover, the degree of opening of the check valve 16 is coupled to the flow velocity of the coolant. As a result, a maximum flow of the coolant through the interior heater 12 via the heating line h is made possible when the speed of the internal combustion engine 2 is low and the pumping capacity of the pump 8 is consequently low. In contrast, a high speed of the internal combustion engine 2 brings about a high pumping capacity of the pump 8, as a result of which the check valve 16 opens wide due to the higher flow velocity of the coolant, and an increased return flow through the bypass 9a and back to the internal combustion engine 2 is achieved. By this means, increased supply of coolant to the heat exchanger 14 at high engine speeds is achieved, thereby allowing rapid heating of the transmission oil.

By means of the thermostat 5, which typically acts in both directions, the bypass 9a is closed at high temperatures of the coolant, and the coolant is directed primarily through the feed line c to the cooler 3 and, from the latter, back via the cooler return d. As a result, the temperatures of the coolant in the return are approximately the same as those in the lower line routing, thereby resulting in a high temperature difference $\Delta T$ between the transmission oil and the coolant in the heat exchanger 14.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A temperature control arrangement for transmission oil in a motor vehicle, comprising:
a coolant circuit which fluidly connects an internal combustion engine and a cooler, the coolant circuit having a pump that initiates coolant flow, the coolant circuit having a thermostat, the thermostat being configured to receive coolant from the pump and being fluidly connected to an interior heater, to the cooler, and to a bypass configured to direct coolant to the engine bypassing the cooler, the thermostat being configured to direct a first fraction of a coolant leaving the internal combustion engine back to the internal combustion engine through the bypass and a second fraction of the coolant returning to the internal combustion engine through the cooler, the coolant circuit further including a junction, the junction receiving the first fraction and second fraction, the junction outputting a third fraction of the coolant; and
a heat exchanger for heat transmission between the coolant and the transmission oil, wherein in a single circuit some of the third fraction can be directed from the junction in a same direction first through the heat exchanger and then to the internal combustion engine.

2. The temperature control arrangement of claim 1, wherein the thermostat has a check valve, the check valve being configured to adjust a flow of the coolant leaving the internal combustion engine into the bypass and the interior heater in accordance with a flow velocity thereof, wherein an amount of coolant directed through the bypass is increased as the flow velocity of the coolant increases.

3. The temperature control arrangement of claim 1, further comprising an EGR cooler, which is arranged downstream of the interior heater, between the heater and the internal combustion engine.

4. A method for controlling a temperature of transmission oil in a motor vehicle, the vehicle having a temperature control arrangement comprising a coolant circuit which fluidly connects an internal combustion engine and a cooler, the coolant circuit having a thermostat, the thermostat being fluidly connected to a bypass configured to direct coolant to the engine bypassing the cooler, the coolant circuit further having a junction, the junction being downstream of and in fluid communication with the cooler and the bypass, the method comprising:
  controlling the thermostat to direct a first fraction of a coolant leaving the internal combustion engine back to the internal combustion engine, a first portion of the first fraction being directed into the bypass and thereafter to the junction, a second portion of the first fraction being directed through the cooler and thereafter to the junction, wherein heat is transmitted between the cooler and the transmission oil by a heat exchanger; and
  in a single circuit, directing a third portion of coolant from the junction through the heat exchanger and subsequently to the internal combustion engine, wherein a second fraction of the coolant leaving the internal combustion engine is directed by means of the thermostat to an interior heater and, if required, to the cooler.

5. The method of claim 4, wherein the thermostat has a check valve configured to adjust a flow of the coolant leaving the internal combustion engine into the bypass and the interior heater in accordance with a flow velocity thereof, wherein an amount of coolant directed through the bypass is increased as the flow velocity of the coolant increases.

6. The method of claim 4, wherein the temperature control arrangement further comprises an EGR cooler, through which coolant leaving the interior heater and flowing back to the internal combustion engine flows.

7. A cooling system comprising:
  a thermostat configured to selectively divide coolant from an engine between at least a bypass and a cooler passage, the cooler passage passing through a cooler and joining the bypass at a junction; and
  a split downstream of the junction configured to, within a single circuit, direct a first portion of coolant to the engine and a second portion of coolant to a transmission heat exchanger and subsequently to the engine.

8. The cooling system of claim 7, wherein the thermostat is further configured to further divide the coolant into a heater passage, the heater passage being in fluid communication with an interior heater and subsequently with the engine.

9. The cooling system of claim 8, further comprising an EGR cooler arranged in fluid communication with and downstream of the interior heater and upstream of the engine.

10. The cooling system of claim 8, wherein the thermostat includes a check valve configured to increase a fraction of coolant flow directed into the bypass in response to an increase in a coolant flow velocity.

* * * * *